US005692161A

United States Patent [19]
Basset et al.

[11] Patent Number: 5,692,161
[45] Date of Patent: Nov. 25, 1997

[54] METHOD AND APPARATUS FOR OPERATING A MICROCOMPUTER IN AN EMULATION MODE TO ACCESS AN EXTERNAL PERIPHERAL

[75] Inventors: Philippe Basset, Meylan; Pierre Tarayre, Echirolles, both of France

[73] Assignee: SGS-Thomson Microelectronics S.A., Saint Genis, France

[21] Appl. No.: 509,218

[22] Filed: Jul. 31, 1995

Related U.S. Application Data

[63] Continuation of Ser. No. 128,532, Sep. 29, 1993, abandoned.

[30] Foreign Application Priority Data

Oct. 2, 1992 [FR] France ................................. 92 11716

[51] Int. Cl.$^6$ .............................................. G06F 13/10
[52] U.S. Cl. ........................... 395/500; 395/829; 395/834
[58] Field of Search .............................. 395/500, 735, 395/834, 412, 829

[56] References Cited

U.S. PATENT DOCUMENTS

| | | | |
|---|---|---|---|
| 4,441,154 | 4/1984 | McDonough et al. | 395/800 |
| 4,514,805 | 4/1985 | McDonough et al. | 395/734 |
| 4,649,471 | 3/1987 | Briggs et al. | 395/421.01 |
| 4,797,808 | 1/1989 | Bellag et al. | 395/183.06 |
| 4,875,186 | 10/1989 | Blune, Jr. | 395/500 |
| 4,949,241 | 8/1990 | Iwasaki | 395/290 |
| 5,001,624 | 3/1991 | Hoffman et al. | 395/825 |
| 5,053,949 | 10/1991 | Allison et al. | 395/375 |
| 5,084,814 | 1/1992 | Vaglica et al. | 395/306 |
| 5,140,687 | 8/1992 | Dye et al. | 395/500 |
| 5,155,812 | 10/1992 | Ehlig et al. | 395/879 |
| 5,155,839 | 10/1992 | Weppler | 395/500 |
| 5,168,559 | 12/1992 | Tamura | 395/494 |
| 5,247,642 | 9/1993 | Kadlee | 395/403 |
| 5,291,584 | 3/1994 | Challa et al. | 395/500 |
| 5,361,348 | 11/1994 | Nakamoto | 395/183.14 |
| 5,457,802 | 10/1995 | Catherwood et al. | 395/750 |

OTHER PUBLICATIONS

EDN Electrical Design News, vol. 24, No. 6, Mar. 16, 1989, Newton, Massachusetts, pp. 131–144, Eric P. Horton, "Contruct a Low–Cost 8096–Family Development System".

EDN Electrical Design News, vol. 31, No. 23, Nov. 13, 1986, Newton, Massachusetts, US pp. 193–207, Eric P. Horton, "Make Your Own Low–Cost 8051 Emulator".

Intel, APX 86/88, 186/188 User's Manual, 1985, pp. 3–11 to 3–19.

Intel, APX 86/88, 186/188 User's Manual, 1985, pp. 3–11 to 3–14.

*Primary Examiner*—Kenneth S. Kim
*Attorney, Agent, or Firm*—Wolf, Greenfield & Sacks, P.C.; James H. Morris

[57] ABSTRACT

Disclosed is a microcomputer capable of working in emulation mode with internal and external peripherals. The microcomputer comprises a central processing unit, an internal address decoder, an internal memory and internal peripherals connected to a data and address bus. The central processing unit has input/output ports for external access in user mode according to the invention. The input/output ports are connected to the external peripherals and to an external address decoder. The external address decoder sends out a signal applied to the central processing unit to block the pre-loading of the internal address decoder when an external peripheral is selected in emulation mode.

19 Claims, 1 Drawing Sheet

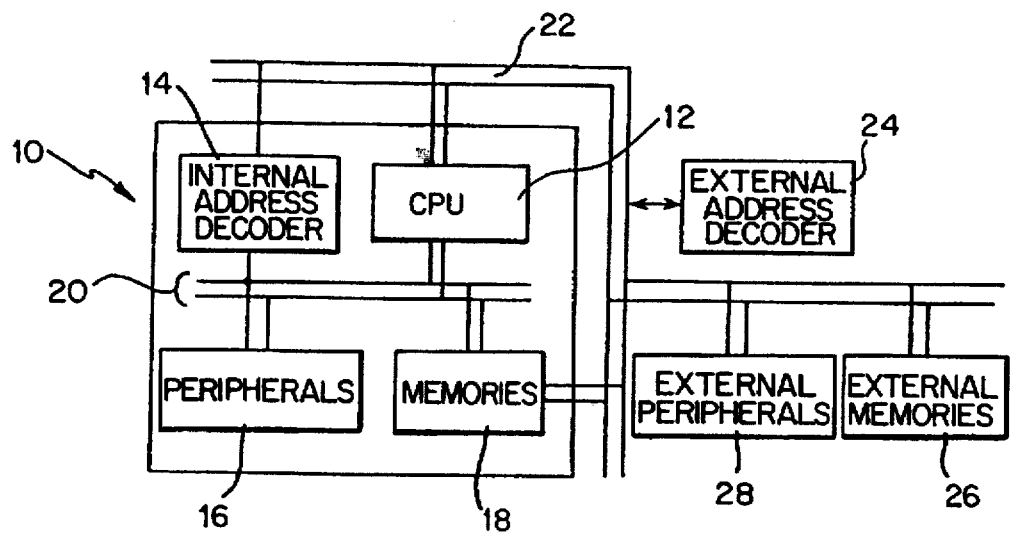
FIG_1
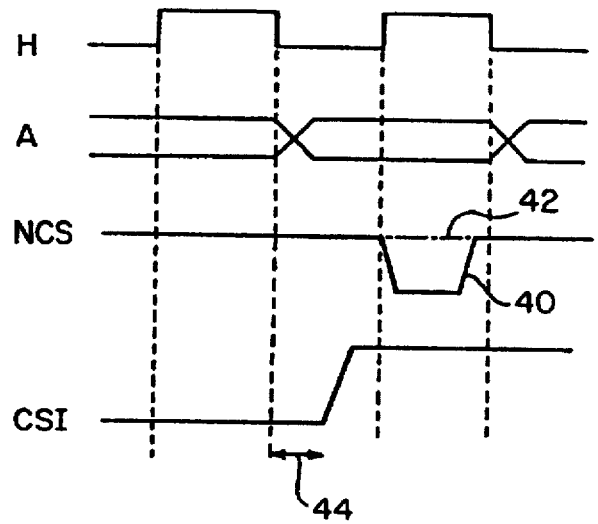
FIG_2
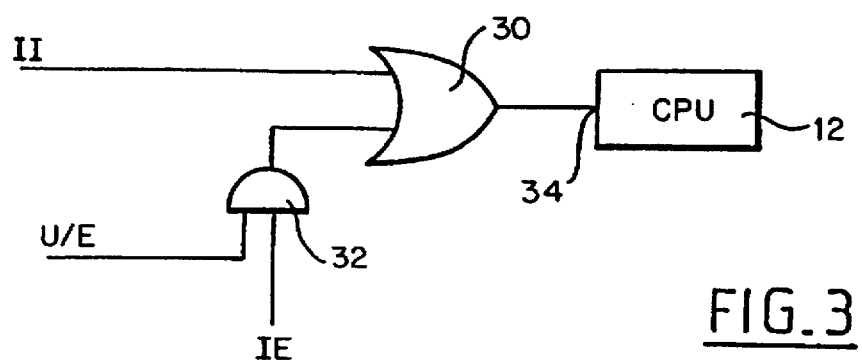
FIG_3

METHOD AND APPARATUS FOR OPERATING A MICROCOMPUTER IN AN EMULATION MODE TO ACCESS AN EXTERNAL PERIPHERAL

This application is a continuation, of application Ser. No. 08/128,532, filed Sep. 29, 1993 now abandoned.

BACKGROUND OF THE INVENTION

1. Field of the Invention

The present invention relates to a microcomputer that can work in emulation mode with external and internal peripherals.

It is known that a microcomputer generally comprises a central processing unit or CPU, at least one internal peripheral (clock, analog-digital converter etc.), an internal address decoder and an internal memory (ROM, RAM, EEPROM, EPROM, etc.) connected by an address and data bus. The central processing unit has ports and a bus for external connection in user mode.

2. Description of the Prior Art

It is often necessary to emulate circuits that do not yet exist. To do this, it would be desirable to use microcomputers that already exist. However, if a peripheral of the microcomputer is not functional or does not exist, it is then impossible to recreate its function inside the microcomputer. It is then not possible to obtain an emulator.

The present invention is aimed at overcoming this drawback by means of a microcomputer possessing internal peripherals and external peripherals that are accessible selectively. Thus, if an internal peripheral does not correspond to the requirement, it is possible to recreate its function outside the microcomputer. Furthermore, it becomes possible to use a micrometer to emulate several different microcomputers.

According to the invention, in emulation mode, the ports of the microcomputer are connected to external peripherals and to an external address decoder. The external address decoder sends out a signal applied to the central processing unit to block the pre-loading of the internal address decoder when an external peripheral is selected.

Preferably, external memories are also connected to the input/output ports, one external peripheral having access only to one external memory.

Advantageously, when the central processing unit has at least one interrupt input that can be used by a peripheral, the interrupt request signals coming from the internal and external peripherals are applied respectively in emulation mode to the inputs of an OR gate, the output of which is connected to the interrupt input of the central processing unit.

The interrupt signal coming from the external peripheral is first of all applied to an input of an AND gate, to the other input of which there is applied a signal corresponding to the mode of operation of the microcomputer.

SUMMARY OF THE INVENTION

The present invention will be better understood, and other advantages, characteristics and possibilities will appear more clearly from the following description of an embodiment, given on a non-restrictive basis, to which there is appended a sheet of drawings, wherein:

FIG. 1 gives a schematic view of a microcomputer organized according to the invention;

FIG. 2 is a timing diagram of some signals in the microcomputer of FIG. 1, and

FIG. 3 provides a schematic illustration of the logic circuit of an interrupt input of the central processing unit.

DETAILED DESCRIPTION

Referring now to FIG. 1, a microcomputer 10 comprises a central processing unit 12, peripherals 16, memories 18 and an internal address decoder 14, these various components being connected to a data and address bus 20. The central processing unit 12 comprises input/output ports 22 for external access in user mode.

For operation in user mode with external peripherals, the external peripherals 28 and external memories 26 are connected to the input/output ports of the central processing unit 12. Thus, in emulation mode, the input/output ports, for external access, of the central computer 12 are used as a data bus and as an address and control bus.

According to the invention, an external address decoder 24 is connected to the input/output ports, for external access, of the central processing unit 12. This decoder sends back a signal indicating whether the address of a peripheral is an internal or external address.

Conventionally, the exchanges of information elements between the peripherals 16 and the central processing unit 12 are done, as shown succinctly in FIG. 2, by means of a square-wave type of clock signal H, sixteen address signals A positioned on the descending edges of the clock signal, eight data signals not shown in FIG. 2, the values of which change during the rising edges of the clock signal, a signal, also not shown, indicating whether it is a writing or a reading operation, a signal for the selection of the peripheral generated by the address decoder and, finally, a central processing unit interrupt signal.

The signal for the selection of the peripheral, represented by the initials NCS in FIG. 2, is normally active in the low state. When the clock signal is in the low state, there is a pre-loading of the address decoder. When the clock signal goes to the high state, there is an activation of the selection signals and the selection signal goes to the low state (40, FIG. 2).

In the user mode, the addressing of a peripheral by the central processing unit 12 is achieved in one clock cycle H as follows: when the clock signal is in the low state, there is a positioning of the addresses by the central processing unit 12, a positioning of the write/read signal and a pre-loading of the address decoder. When the clock signal goes to the high state, the pre-loading of the decoder stops and there is an activation of the signal for the selection of the selected peripheral, then the data elements are enforced on the data bus by the central processing unit 12 during a writing cycle or by the selected peripheral when there is a reading cycle. Naturally, an interrupt request to the central processing unit may be made at any time by a peripheral.

As indicated here above, according to the invention, an external address decoder 24 is connected to the input/output ports 22, as also are peripherals 28 and memories 26. The external address decoder 24 sends out a signal (CSI, FIG. 2) changing its state as a function of the address indicated, i.e. remaining in the low state so long as the address indicated is an internal address and passing to the high state when the address indicated is an address external to the microcomputer 10. This signal is reintroduced into the central processing unit 12.

Thus, in emulation mode, the addressing enables the choice of an internal or external address. The addressing of the peripherals by the central processing unit 12 is done also in a clock cycle H. When the clock is in the low state, there is a positioning of the addresses by the central processing unit 12, a positioning of the read/write signal and the pre-loading of the internal address decoder but, in addition, there is the external decoding of the addresses by the decoder 24 and transmission of the signal CSI resulting from the external decoding. When the clock signal H goes to the high state, there are then two possibilities depending on the state of the signal CSI. If the signal CSI is in the low state, this means that it is an internal peripheral 16 that has been selected, and the microcomputer 10 acts as usual. If the signal CSI is in the high state, then the signal NCS for the pre-loading of the internal address decoder remains off in the high state as indicated by dots and dashes 42 in FIG. 2, and then the data elements are enforced on the input/output ports 22, then working as a data bus, either by the central processing unit 12 on a writing cycle or by the external peripheral 28 on a reading cycle.

It is observed therefore that a microcomputer such as this can work in emulation mode with internal peripherals as well as with external peripherals.

As we have seen, the signal CSI generated by external address decoder 24 changes its state only when the clock signal H is in the low state. Thus, there is one time lag 44 (FIG. 2) between the descending edge of the clock signal and the rising edge of the signal CSI emitted by the address decoder 24. This lag 44 is smaller than the clock half-cycle and, consequently, it does not prevent the required blocking signal for pre-loading the internal address decoder.

As indicated here above, it should be possible, at any time, for an interrupt request to be made by a peripheral, both external and internal, to the central processing unit 12. Five interrupt inputs are dedicated to the external peripherals. FIG. 3 shows one of the interrupt inputs of the central processing unit 12. This interrupt input 34 is connected to the output of an OR gate 30, to the two inputs of which the interrupt request signals are applied. One of these two inputs of the OR gate 30 receives the internal interrupt request signal II directly and the other input receives an interrupt request signal from an external peripheral IE by means of an AND gate that enables the request to be validated if the microcomputer works in emulation mode. Thus, a signal corresponding to the mode used U/E, namely to the user mode or the emulation mode, is applied to the other input gate of the AND gate 32.

Although only a preferred embodiment of the invention has been described, it is clear that any modification made in the same spirit will not go beyond the scope of the invention as defined herein.

What is claimed is:

1. A microcomputer working in an emulation mode with at least one external peripheral to emulate another computer system capable of performing at least one function of the external peripheral, the microcomputer comprising:
    a central processing unit that outputs addresses of peripherals to be accessed,
    at least one internal peripheral,
    an internal address decoder that is pre-loaded with addresses in response to a system clock signal, the internal address decoder decoding each pre-loaded address and selecting a corresponding internal peripheral, and
    an internal memory connected to the central processing unit by a data and address bus,
    the central processing unit having first and second input/output ports that, in the emulation mode, are respectively connected to said at least one external peripheral and to an external address decoder, the external address decoder sending out a signal applied to the central processing unit when an external peripheral is selected by an address output from the central processing unit, said microcomputer being configured to block the pre-loading of the internal address decoder in response to the signal from the external address decoder.

2. A microcomputer according to claim 1, wherein an external memory is also connected to the first input/output port.

3. A microcomputer as recited in claim 1, wherein said central processing unit comprises at least one interrupt input, wherein interrupt request signals coming from the internal and external peripherals are applied respectively to the inputs of an OR gate, the output of which is connected to said at least one interrupt input, the interrupt request signal coming from an external peripheral being first applied to a first input of an AND gate, a second input of the AND gate receiving a signal indicating a mode of operation of the microcomputer.

4. A microcomputer as recited in claim 2, wherein said central processing unit comprises at least one interrupt input, wherein interrupt request signals coming from the internal and external peripherals are applied respectively to the inputs of an OR gate, the output of which is connected to said at least one interrupt input, the interrupt request signal coming from an external peripheral being first applied to a first input of an AND gate, a second input of the AND gate receiving a signal indicating a mode of operation of the microcomputer.

5. The microcomputer as recited in claim 1, wherein said central processing unit comprises at least one interrupt input responsive to interrupt request signals, generated by either the internal or external peripherals, an external interrupt only being accepted when the microcomputer is operating in the emulation mode.

6. A method for enabling a first microcomputer to emulate the performance of a second microcomputer, the second microcomputer capable of performing a specified circuit function that includes the manipulation of data in a required manner, the first microcomputer including at least one internal peripheral, the first microcomputer being unable to manipulate data in the manner required by the specified circuit function, the first microcomputer further including a processor, connected to the internal peripheral through an internal address bus and an internal data bus to communicate with the internal peripheral, an internal address decoder coupled to the internal address bus, and at least one input/output port, the method including the steps of:
    providing an external peripheral capable of manipulating data in the manner required by the specified circuit function;
    providing an external address decoder to decode address signals;
    coupling the external peripheral and the external address decoder through the at least one input/output port to the internal address and internal data buses to create a system address bus and a system data bus; and
    operating the first microcomputer such that the processor communicates with the external peripheral over the system address bus and the system data bus to perform the specified circuit function, the step of operating including steps of:
        placing a plurality of address signals on the system address bus from the processor via the internal address bus;
        decoding the address signals in the external address decoder;

pre-loading the internal address decoder with addresses on the internal address bus; and sending a blocking signal from the external address decoder to the internal address decoder when an external address is detected on the system address bus by the external address decoder to block the pre-loading of the internal address decoder.

7. A method for enabling a first microcomputer to emulate the performance of a second microcomputer as recited in claim 6, wherein the first microcomputer includes internal address and data buses coupling the processor to the at least one internal peripheral, and wherein the method further includes the step of:

coupling the at least one input/output port to the internal address and data buses.

8. A method for operating a microcomputer system, the system including a microcomputer having at least one internal peripheral and a processor, the microcomputer further including internal address and data buses coupling the processor to the at least one internal peripheral and an internal address decoder coupled to the internal address bus, the microcomputer having at least one input/output port, the system further including at least one external peripheral and an external address decoder that are external to the microcomputer, the method including the steps of:

A. coupling the at least one input/output port to the internal address and data buses;

B. coupling the external peripheral and the external address decoder, through the at least one input/output port, to the internal address and data buses to create system address and data buses; and C. operating the microcomputer to pass, via the processor the internal buses and the system buses, addresses and data between the processor the at least one internal peripheral and the at least one external peripheral, the at least one external peripheral being accessed by the processor over the system address and data buses, the step of operating including steps of:

placing a plurality of address signals on the system address bus from the processor and decoding the address signals in the external address decoder;

pre-loading the internal address decoder with addresses on the internal address bus; and sending a blocking signal from the external address decoder to the internal address decoder when an external address is detected on the system address bus by the external address decoder to block the pre-loading of the internal address decoder.

9. A method for operating a microcomputer system as recited in claim 8 wherein step C includes the steps of:

specifying user and emulation modes for the microcomputer; and inhibiting the at least one external peripheral so that it cannot interrupt the processor when the user mode is specified.

10. A microcomputer system, comprising:
a microcomputer including:
at least one internal peripheral;
a processor;
an internal address bus coupling the processor to the at least one internal peripheral;
an internal data bus coupling the processor to the at least one internal peripheral;
an internal address decoder, coupled to the internal address bus, that is pre-loaded with addresses on the internal address bus; and
at least one input/output port coupled to the internal address and data buses;
an external address bus;
an external data bus;
at least one external peripheral that is external to the microcomputer, the at least one external peripheral being coupled, through the external address and data buses and the at least one input/output port, to the internal address and data buses so that the external peripheral can be accessed by the processor; and
an external address decoder external to the microcomputer and coupled to the external address and data buses, wherein the external address decoder decodes addresses placed on the external address bus, the external address decoder being adapted to send a blocking signal to block the preloading of the internal address decoder when an external address is detected on the external address bus by the external address decoder.

11. A microcomputer system as recited in claim 10, further comprising:

at least one external memory, associated with the at least one external peripheral, coupled to the external address and data buses.

12. A microcomputer system as recited in claim 10, wherein the processor includes at least one interrupt input that is responsive to an external interrupt signal sourced by the at least one external peripheral.

13. A microcomputer system as recited in claim 12, wherein the microcomputer generates a mode output indicating whether the system is operating in user mode or in emulation mode, and wherein the system further includes means, responsive to the mode output, for inhibiting the external interrupt signal when the system is in user mode.

14. A microcomputer system as recited in claim 12, wherein the microcomputer generates a mode output indicating whether the system is operating in user mode or in emulation mode, and wherein the system further includes an inhibiting circuit that inhibits the external interrupt signal when the system is in user mode.

15. A microcomputer system as recited in claim 14, wherein the inhibiting circuit includes an AND gate that has a first input responsive to the external interrupt signal, and a second input responsive to the mode signal.

16. A microcomputer system, comprising:
a microcomputer including:
at least one internal peripheral;
a processor;
an internal address bus coupling the processor to the at least one internal peripheral;
an internal data bus coupling the processor to the at least one internal peripheral;
an internal address decoder, coupled to the internal address bus, that is pre-loaded with addresses on the internal address bus: and
at least one input/output port coupled to the internal address and data buses;
an external address bus;
an external data bus;
first and second external peripherals that are external to the microcomputer and perform functions, the function performed by the first external peripheral being different from that performed by the second peripheral, the first and second external peripherals being coupled to the processor through the external address and data buses and the at least one input/output port so that the first and second external peripherals can be accessed by the processor; and an external address decoder external to the microcomputer and coupled to the external address and data buses, wherein the external address decoder decodes addresses placed on the external address bus, the external address decoder being adapted to send a blocking signal to block the preloading of the internal address decoder when an external address is detected by the external address decoder.

17. The microcomputer system recited in claim 16, further comprising a plurality of external memories, each respectively corresponding to one of the plurality of external peripherals.

18. A method for operating a first microcomputer in an emulation mode wherein the first microcomputer emulates the performance of a second microcomputer having an internal peripheral that performs a specified function, the first microcomputer having a processor, at least one internal peripheral, an internal address bus, an internal address decoder, and an internal data bus, the internal address and data buses coupling the processor to the at least one internal peripheral, the first microcomputer further having at least one input/output port coupled to the internal address and data buses, the method including the steps of:

A. providing at least one external peripheral that performs the specified function;

B. providing an external address decoder;

C. coupling the external peripheral and the external address decoder, via the at least one input/output port, to the internal address and data buses; and D. operating the first microcomputer so that the processor accesses the at least one external peripheral via the input/output port to perform the specified function, whereby the first microcomputer emulates the performance of the second microcomputer, the step of operating including steps of:

placing a plurality of address signals on the internal address bus from the processor and decoding the address signals in the external address decoder;

pre-loading the internal address decoder with addresses on the internal address bus; and sending a blocking signal from the external address decoder to the internal address decoder when an external address is detected by the external address decoder to block the pre-loading of the internal address decoder.

19. The method for operating a first microcomputer system in an emulation mode, as recited in claim 18, further comprising the steps of:

E. providing an interrupt input in the processor that is responsive to an interrupt signal generated by either of the at least one internal peripheral and the at least one external peripheral; and F. enabling the interrupt signal from the external peripheral to be effective only when the first microcomputer is operating in an emulation mode.

* * * * *